United States Patent Office.

CHRISTIAN RUDOLPH, OF OFFENBACH-ON-THE-MAIN, GERMANY, ASSIGNOR TO THE FIRM OF K. OEHLER, OF SAME PLACE.

BROWN AZO DYE.

SPECIFICATION forming part of Letters Patent No. 558,614, dated April 21, 1896.

Application filed November 14, 1895. Serial No. 568,988. (Specimens.)

*To all whom it may concern:*

Be it known that I, CHRISTIAN RUDOLPH, chemist, doctor of philosophy, residing at Offenbach-on-the-Main, Germany, have invented new and useful Improvements in and Relating to New Brown Azo Dyestuffs and the Production of Them, of which the following is a specification.

My invention consists in the production of a new brown azo dyestuff dyeing unmordanted cotton containing the azo group—N=N—eight times in a molecule and belonging to the type—

Tetrazo compound of the naphthylene-diamin-disulfo-acid { Bismarck-braun sulfo-acid
Diazo sulfo-acid
Bismarck-brown sulfo-acid
Diazo sulfo-acid.

By the term "Bismarck-brown sulfo-acid" in this specification is meant the product which can be obtained by the reaction of one molecule of diazotized toluylenediamin-sulfo-acid $(CH_3:NH_2:SO_3H:NH_2=1:2:4:6)$ upon two molecules of metaphenylenediamin or toluylenediamin, respectively, the process of production of which is described in the United States Letters Patent No. 465,116, dated December 15, 1891, granted to me, wherein the Bismarck-brown sulfo-acid is called "toluylenediamin-sulfo-acid-diazo-metaphenylenediamin. Further, by the term "diamido-beta-naphthalene-disulfo-acid" used in this specification is meant the product which will be obtained by nitration of beta-naphthalene-disulfo-acid $(SO_3H:SO_3H=2:6)$ and subsequent reduction of the thus-formed dinitro-beta-naphthalene-disulfo-acid.

The invention hereinafter described is founded on my observation that two molecules of Bismarck-brown sulfo-acid can be combined with one molecule of diazotized diamido-beta-naphthalene-disulfo-acid, thus yielding a dyestuff which can further be combined with a diazotized aromatic amido-sulfo-acid.

As an example in which manner my invention may be carried out and brought into practical effect, I shall describe the production of the new dyestuff from diamido-beta-naphthalene-disulfo-acid, Bismarck-brown sulfo-acid, and naphthionic acid.

Parts are parts by weight. Suspend eight (8) parts of diamido-beta-naphthalene-disulfo-acid in about two hundred (200) parts of water, mix with eleven (11) parts of hydrochloric acid of 20° Baumé, and diazotize by running in a solution of three and five-tenths (3.5) parts of sodium nitrite in eight (8) parts of water. The tetrazo compound thus formed is poured, while stirring, into a solution of twenty-three and one-tenth (23.1) parts of Bismarck-brown sulfo-acid in five hundred (500) parts of water and twenty (20) parts of soda. The formation of the intermediate product begins at once and is finished after twenty-four (24) hours. Then the diazo-naphthalene-sulfo-acid, resulting from twelve and three-tenths (12.3) parts of naphthionate of soda, twenty (20) parts of muriatic acid of 20° Baumé, three and a half (3.5) parts of sodium nitrite and the necessary quantity of water, is poured to the former solution. Allow the whole to stand for twenty-four (24) hours, then boil up, precipitate the dyestuff with common salt, press, and dry.

The dyestuff thus obtained forms a black-brown powder soluble in concentrated sulfuric acid to a violet-brown solution, which turns into a yellowish brown on diluting with water. Hydrochloric acid throws down a brown precipitate from the brown aqueous solution, on which diluted soda-lye has no action.

The dyestuff dyes unmordanted cotton from an alkaline soap-bath, yielding clear chestnut-brown shades, which are quite fast to soap.

Now what I claim, and desire to secure by Letters Patent, is—

1. The process of making a new brown azo dyestuff, dyeing unmordanted cotton, consisting in first combining two molecules of Bismarck-brown sulfo-acid with one molecule of diazotized diamido-beta-naphthalene-disulfo-acid and afterward combining with this intermediate compound two molecules of diazo-naphthionic acid, substantially as hereinbefore described.

2. The hereinbefore-described brown polyazo dyestuff, forming a black-brown powder and being characterized by the following properties: it dissolves in concentrated sulfuric acid to a violet-brown solution, hydrochloric acid throws down a brown precipitate from the brown aqueous solution, on which diluted soda-lye has no action, all substantially as hereinbefore described.

In testimony whereof I have signed my name to this specification in the presence of two subscribing witnesses.

CHRISTIAN RUDOLPH.

Witnesses:
JEAN GRUND,
ALVESTO S. HOGUE.